United States Patent
Becker

(10) Patent No.: US 6,199,915 B1
(45) Date of Patent: Mar. 13, 2001

(54) CONNECTOR ELEMENT FOR TUBING OR HOSES

(75) Inventor: Hermann Becker, Brilon (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/196,513

(22) Filed: Nov. 20, 1998

(30) Foreign Application Priority Data

Nov. 20, 1997 (DE) ............................................. 197 51 361

(51) Int. Cl.$^7$ ................................................... F16L 33/30
(52) U.S. Cl. ........................... 285/239; 285/347; 285/910
(58) Field of Search .................................. 285/239, 347, 285/910, 256; 277/626

(56) References Cited

U.S. PATENT DOCUMENTS

| | | | | |
|---|---|---|---|---|
| 2,298,119 | * | 10/1942 | Gerbert | 285/347 |
| 2,453,997 | * | 11/1948 | MacWilliam | 285/347 |
| 2,508,306 | * | 5/1950 | Thurston et al. | 285/347 |
| 4,589,688 | * | 5/1986 | Johnson | 285/347 |
| 4,597,594 | * | 7/1986 | Kacalieff et al. | 285/239 |
| 4,603,890 | | 8/1986 | Huppee | 285/239 |
| 5,096,231 | * | 3/1992 | Chisnell et al. | 285/256 |

FOREIGN PATENT DOCUMENTS

| | | | |
|---|---|---|---|
| 34 39 522 | 8/1985 | (DE) . | |
| 41 22 455 | 1/1993 | (DE) . | |
| 0 222 051 | 5/1987 | (EP) . | |
| 2 081 406 | 2/1982 | (GB) . | |
| 1528995 * | 12/1989 | (RU) | 285/259 |
| WO95/33157 | 12/1995 | (WO) . | |

* cited by examiner

*Primary Examiner*—Dave W. Arola
(74) *Attorney, Agent, or Firm*—Robert P. Seitter

(57) ABSTRACT

A connector element is provided for tubing or hoses of elastically expandable material with a tubular part of inelastic material that can be inserted tightly sealed into a tubing or hose end and that features a so-called pine-cone or thorn profile. In order to simplify the handling and to improve the sealing effect, this connector element has an axially extending cylindrical area with an outer diameter matched to the inner diameter of the tubing or hose end at the front end of the tubular part. A circumferential groove, rectangular in cross section, into which an annular seal of noncircular cross section is arranged is formed in the cylindrical area.

14 Claims, 1 Drawing Sheet

CONNECTOR ELEMENT FOR TUBING OR HOSES

BACKGROUND OF THE INVENTION

The invention pertains to a connector element for tubing or hoses of elastically expandable material with a tubular part of inelastic material that can be inserted in a tightly sealed manner into a tubing or hose end and that has a so-called pine-cone or thorn profile.

Connector or coupling elements with such insertion ends are already known in a variety of forms. They are used with tubing and hose lines that are designed for water or other fluids with at most a few bar of positive pressure with respect to ambient pressure. The pine-cone or thorn profiles formed on the tubular part are intended to guarantee that tubing or hose ends can be connected in a tightly sealed manner to the connector element without additional fastening parts, a friction and form-fit connection generally being produced, in which the tubing or hose end is slightly expanded and exerts radially inward-directed restoring forces, while the sharp edges of the pine-cone or thorn profile made of inelastic material dig into the inside wall of the tubing or hose end-like barbs.

It ought to be immediately obvious that the success of such a combined insertion connection depends to quite a considerable extent on the manufacturing tolerances of the components involved and on their material properties. In order to improve the sealing of such insertion connections, it has already been proposed to provide a circular section on the front end of the tubular part and to form a circumferential groove therein for an O-ring. In this way, the sealing effect could be improved. It has turned out, however, that an improved sealing effect can be achieved only if the insertion of the tubular part into the tubing or hose end is done with great care; because, otherwise, the O-ring is pressed out of the groove or twisted about itself to a differing extend across its circumference whereby its sealing effect is lost. Due to the tight matching with the circular area on the inner diameter of the tubing or hose end, considerable shearing forces on the O-ring arise during insertion, which moreover are dependent on the surface roughness of the inside wall of the tubing or hose end, so that displacement or damaging of the O-ring cannot be reliably avoided even with careful handling.

The invention is based on the problem of avoiding the aforementioned disadvantages in a connector element of the type mentioned initially and forming the insertable tubular part such that a reliable sealing of the insertion connection is achieved and displacement or damaging of the sealing element can be avoided.

SUMMARY OF THE INVENTION

This problem is solved according to the invention in that an axially extending circular area on the front end of the tubular part is provided with an outer diameter matched to the inner diameter of the tubing or hose end and in that, in this area, a circumferential groove with a rectangular cross section is formed, in which an annular seal with noncircular cross section is arranged. It is particularly practical if the seal element has a rectangular cross section completely filling out the groove.

The advantages of such cross-sectional shapes for the groove and seal is that shearing forces on the seal can be safely absorbed, without the seal being driven out of the groove or being deformed within itself such that its sealing effect is lost. The rectangular groove bottom and the matched cross section of the annular seal guarantee a secure form-fit connection between the tubular part and the seal, which holds reliably even when inserted into a tubing or hose end, without any extraordinarily careful handling being required.

BRIEF DESCRIPTION OF THE DRAWINGS

Other objects, features and advantages of the present invention will become apparent by reference to present invention will become apparent by reference to the following detailed description and drawings, in which.

DESCRIPTION OF THE PREFERRED EMBODIMENT

Figure 1:
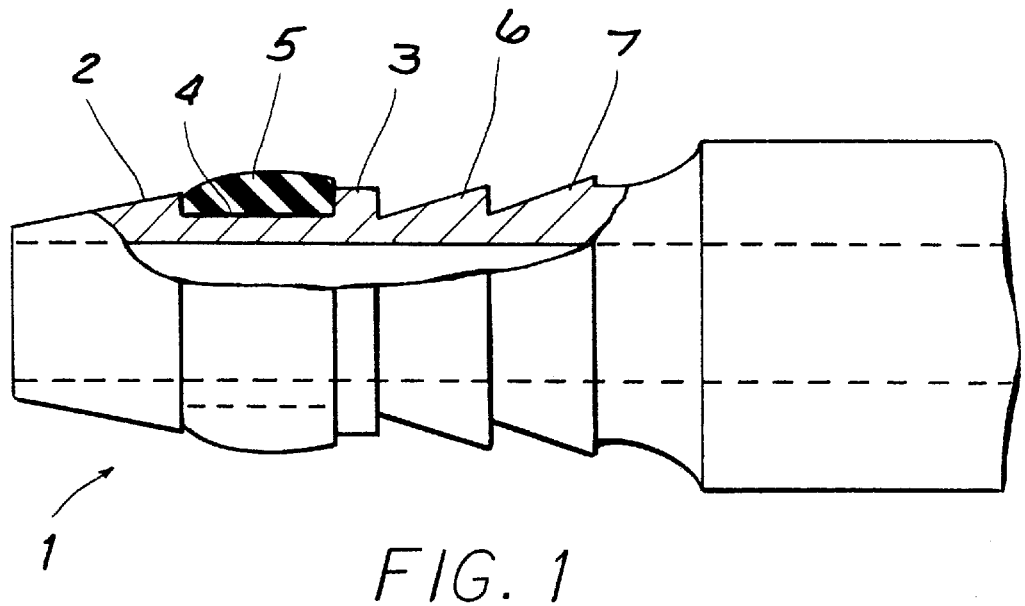
FIG. 1 is the insertion end of a connector element.

In FIG. 1, the insertion end of a connector element for tubing or hoses of elastically expandable material is represented consisting essentially of a tubular part 1 made of inelastic material. Pine-cone or thorn rings 6,7 are formed in a conventional manner on this tubular part 1, each having a conically increasing diameter from front to back and an annular limitation surface at the rear end 2 running perpendicular to the main axis of the tubular part 1. Instead of a pine-cone or thorn ring, an axially extending circular area 3, whose outer diameter is matched to the inner diameter of the tubing or hose for which the connector element is intended, is formed according to the invention at the front end 2 of the tubular part 1. In this circular area 3, a circumferential groove 4 with a rectangular cross section is formed in which the annular seal 5 with a noncircular cross section is arranged. In the illustrated embodiment, the cross section of the seal 5 is shaped such that it is fitted on the inside to the rectangular cross section of the groove 4 and completely fills it out. On the outside, the seal has a curved shape, the radius of which increases continuously from front to back. At the front limitation wall of the groove, the outer diameter of the seal 5 is somewhat smaller than the diameter of the limitation wall of the groove 4, while at the back end of the seal 5, its diameter is greater than the limitation wall of the groove 4 or the cylindrical area 3.

Figure 2:
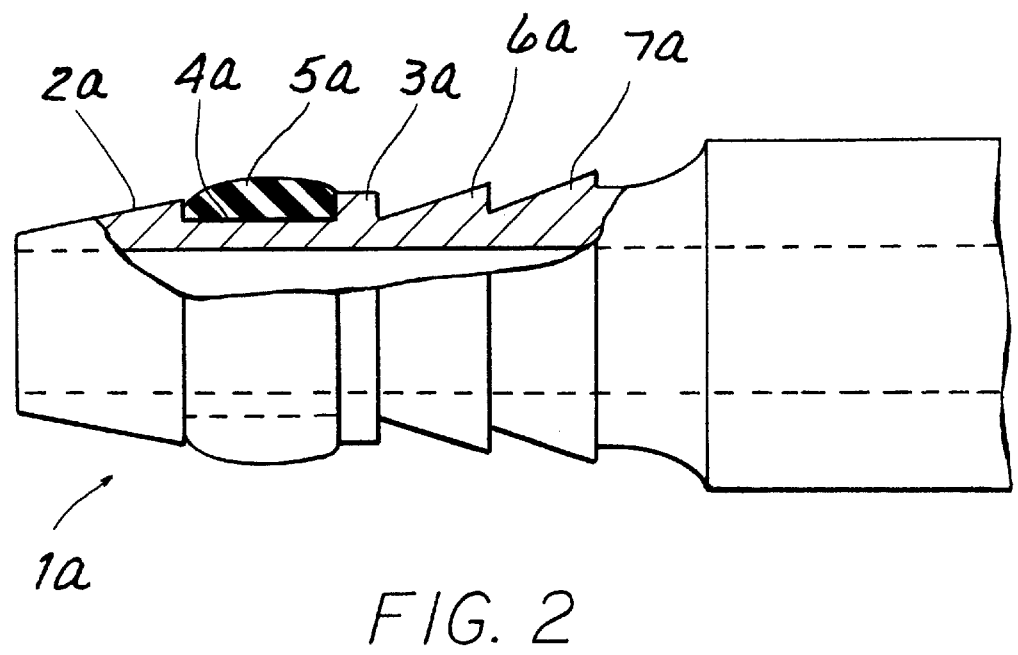
FIG. 2 is the insertion end of the connector element having a seal with a rounded edge.

FIG. 2 shows the tubular part 1*a*, including a front end 2*a*, a circular area 3*a*, a circumferential groove 4*a*, pine-cone or thorn rings 6*a*, 7*a*, and a seal 5*a*, with rounded edges.

Experiments have shown that, with these cross-sectional forms for the groove 4 and the seal 5, an insertion, without problems, of the tubular part 1 into a tubing or hose end is possible, on the one hand, and, on the other, a sealing surface with a relatively long extension can be achieved which is sufficient for all relevant application cases and guarantees a lasting seal between tubular part 1 and the insertion end of the tubing or hose. The outer contour of the seal 5 eases the insertion and reduces the shearing force that act on the seal 5 during insertion.

According to another aspect of the concept of the invention, the pine-cone or thorn ring 6 following the cylindrical area 3 at the rear has a greater diameter than the cylindrical area 3. If additional pine-cone or thorn rings 7 are provided toward the back, then each of their diameters should likewise be slightly larger than the diameter of the preceding pine-cone or thorn ring. This has the effect that the tubing or hose end is expanded further in steps during insertion of the tubular part 1, which can be advantageous particularly with those materials that exhibit only a slight elastic restoring ability. Each additional expansion step occurs practically independently of the preceding step, so that it is not necessary for the expansions of the respective preceding steps to recover completely in order to achieve the required retention forces.

With the characteristics according to the invention, a connector element is created which guarantees a reliable seal of the insertion connection with easy handling and which is usable even with only slightly elastic tubing or hose ends.

What is claimed is:

1. A connector element for tubing or hoses of elastically expandable material with a tubular part of inelastic material that can be inserted tightly sealed into a tubing or hose end and that features one of a pine-cone and thorn profile having at least one ring, characterized in that an axially extending cylindrical area with an outer diameter corresponding to the inner diameter of the tubing or hose end is provided at a front end of the tubular part and in that a circumferential groove, rectangular in cross section, into which an annular seal of noncircular cross section is arranged, is formed in the cylindrical area, the seal having a rectangular cross section completely filling out the groove wherein the cross-section of the seal is rectangular only on the inside of the groove and is convex over the entire longitudinal extent on the outside of the groove, and the outside of the seal has a smaller radius in an area adjacent to the front end of the tubular part than in an opposite area.

2. The connector element according to claim 1, wherein the juncture of the rectangular cross section and the convex surface of the seal has rounded edges.

3. The connector element according to claim 1, characterized in that the outer diameter of the seal is smaller at the front end than the diameter of a limitation wall of the groove.

4. The connector element according to claim 1, characterized in that a front limitation wall of the groove has a smaller diameter than the diameter of a rear limitation wall of the groove.

5. The connector element according to claim 4, characterized in that the cylindrical area has a smaller diameter than the diameter of a next successive pine-cone or thorn ring to the rear of the cylindrical area.

6. The connector element according to claim 5, characterized in that additional rings are provided to the rear of the cylindrical area, each with a larger diameter.

7. The connector element according to claim 6, characterized in that diameter increase per each additional ring lies in the range of 5–12%.

8. A connector element for tubing or hoses of elastically expandable material with a tubular part of inelastic material that can be inserted tightly sealed into a tubing or hose end and that features one of a pine-cone and thorn profile having at least one ring, characterized in that an axially extending cylindrical area with an outer diameter corresponding to the inner diameter of the tubing or hose end is provided at a front end of the tubular part and in that a circumferential groove, rectangular in cross section, into which an annular seal of noncircular cross section is arranged, is formed in the cylindrical area, the seal having a rectangular cross section completely filling out the groove wherein the cross section of the seal is rectangular only on the inside of the groove and is convex over the entire longitudinal extent on the outside of the groove, forming a curved shape on the outside of the seal having a radius that steadily increases from front to back.

9. The connector element according to claim 8, wherein the juncture of the rectangular cross section and the convex surface of the seal has rounded edges.

10. The connector element according to claim 8, characterized in that the outer diameter of the seal is smaller at the front end than the diameter of a limitation wall of the groove.

11. The connector element according to claim 8, characterized in that a front limitation wall of the groove has a smaller diameter than the diameter of a rear limitation wall of the groove.

12. The connector element according to claim 11, characterized in that the cylindrical area has a smaller diameter than the diameter of a next successive pine-cone or thorn ring to the rear of the cylindrical area.

13. The connector element according to claim 12, characterized in that additional rings are provided to the rear of the cylindrical area, each with a larger diameter.

14. The connector element according to claim 13, characterized in that diameter increase per each additional ring lies in the range of 5–12%.

* * * * *